United States Patent [19]

Shigemitsu et al.

[11] Patent Number: 5,376,747

[45] Date of Patent: Dec. 27, 1994

[54] PROCESS FOR PRODUCING VINYL CHLORINE-BASED POLYMER VIA CONTINUOUS OR INTERMITTENT ADDITION OF DISPERSING STABILIZER

[75] Inventors: Minoru Shigemitsu; Tadashi Amano, both of Ibaraki, Japan

[73] Assignee: Shin-Etsu Chemical Co., Ltd., Tokyo, Japan

[21] Appl. No.: 125,764

[22] Filed: Sep. 24, 1993

[30] Foreign Application Priority Data

Sep. 24, 1992 [JP] Japan .................... 4-279397

[51] Int. Cl.$^5$ ............................... C08F 2/20
[52] U.S. Cl. .................... 526/202; 526/344.2
[58] Field of Search ............................ 526/202

[56] References Cited

U.S. PATENT DOCUMENTS 5,096,988  3/1992  Amano .................... 526/200

*Primary Examiner*—Christopher Henderson
*Attorney, Agent, or Firm*—Oblon, Spivak, McClelland, Maier & Neustadt

[57] ABSTRACT

A process for suspension polymerizing vinyl chloride or a monomeric mixture containing the same in an aqueous medium comprising the step of adding a partially saponified polyvinyl alcohol having an average polymerization degree of 600 to 800 and a saponification degree of 65 to 75 mol % to a polymerization system, wherein the partially saponified polyvinyl alcohol is added before start of polymerization, and also after-added continuously or intermittently over the period from the start of polymerization to the time when a polymerization conversion of 10 to 30% is reached. By the suspension polymerization process, it is possible to obtain a vinyl chloride-based polymer having high bulk specific gravity, high gelation rate and a certain level of thermal stability and showing an effectively reduced number of fish eyes when formed into shaped products.

5 Claims, No Drawings

PROCESS FOR PRODUCING VINYL CHLORINE-BASED POLYMER VIA CONTINUOUS OR INTERMITTENT ADDITION OF DISPERSING STABILIZER

BACKGROUND OF THE INVENTION

1. Field of the Invention

The present invention relates to a process for producing a vinyl chloride-based polymer.

2. Description of the Prior Art

Vinyl chloride-based polymers are resins having excellent physical properties, and are used extensively as hard and soft materials for producing shaped products. As a method for processing vinyl chloride-based polymers into shaped products, there have been widely used such methods as calendering, extrusion, injection molding and the like. In connection with extrusion of hard polymers, in particular, development of a vinyl chloride-based polymer having high bulk specific gravity is desired, in order to increase the amount of resin extruded from an extruder.

For production of vinyl chloride polymers, suspension polymerization processes have been widely employed in which vinyl chloride monomer is suspended and dispersed in an aqueous medium and the resulting disperse suspension is subjected to suspension polymerization. It is known that the bulk specific gravity of a polymer obtained by the suspension polymerization is influenced by the kind of dispersing agent, stirring conditions, water-to-monomer amount ratio, and so forth. In order to produce vinyl chloride polymers with high bulk specific gravity by suspension polymerization, there have been proposed, for example, a method in which vinyl chloride monomer is additionally charged during polymerization (Refer to Japanese Pre-examination Patent Publication (KOKAI) No. 59-168008 (1984)), and a method wherein a highly saponified polyvinyl alcohol is used as a dispersing stabilizer for suspending and dispersing the vinyl chloride monomer in an aqueous medium (Refer to Japanese Pre-examination Patent Publication (KOKAI) No. 57-76008 (1982)).

The above-mentioned methods, however, have the drawback that the resulting polymers have poor porosity, leading to increased fish eyes in shaped products obtained therefrom, although the methods can produce vinyl chloride-based polymers with high bulk specific gravity. Besides, the polymers obtained by the methods show lowered rates of gelation, which causes difficulties in processing the polymers into shaped products. Further, there has been the problem of thermal stability being lowered depending on the dispersing stabilizer used.

SUMMARY OF THE INVENTION

It is accordingly an object of the present invention to provide a process for producing, by suspension polymerization, a vinyl chloride-based polymer having high bulk specific gravity and high gelation rate and showing an effectively reduced number of fish eyes when formed into shaped products, while preventing a lowering in thermal stability from occurring.

According to the present invention, there is provided a process for producing a vinyl chloride-based polymer, comprising the steps of adding vinyl chloride monomer or a vinyl chloride-containing monomeric mixture into a polymerization vessel, suspending and dispersing the vinyl chloride monomer or vinyl chloride-containing monomeric mixture in an aqueous medium placed in the polymerization vessel using a dispersing stabilizer, and starting suspension polymerization, wherein said dispersing stabilizer is a partially saponified polyvinyl alcohol having an average polymerization degree of 600 to 800 and a saponification degree of 65 to 75 mol % in an amount of 0.01 to 0.1% by weight based on the amount of the monomer or monomeric mixture, and during the suspension polymerization, an additional amount of the partially saponified polyvinyl alcohol is after-added to the polymerization reaction system in a continuous or intermittent manner over the period from the start of suspension polymerization to the time when a polymerization conversion of 10 to 30% is reached, said additional amount being 0.01 to 0.1% by weight based on the amount of the monomer or monomeric mixture.

DETAILED DESCRIPTION OF PREFERRED EMBODIMENTS

In suspension polymerization, generally, a dispersing stabilizer is added into a polymerization vessel before polymerization is started; more specifically, the dispersing stabilizer is added simultaneously with or subsequently to the charging of an aqueous medium. The amount of the dispersing stabilizer present in the aqueous phase decreases with the lapse of time of stirring, and this tendency becomes more conspicuous after the polymerization is started. In order to maintain the polymerization system in stable suspension, therefore, it is necessary to use the dispersing stabilizer in excess amount. Although the use of an excess of dispersing stabilizer ensures stability of dispersion, it also produces the problems that a thick skin layer arising from the dispersing stabilizer is formed on the surfaces of the resulting polymer and that the polymer obtained is somewhat harder due to lowered porosity; these are, presumably, responsible for increased fish eyes, lowered gelation rate and the like.

According to the present invention, a dispersing stabilizer in only an amount necessary for dispersing the droplets of monomer and the like is added into a polymerization vessel before the start of polymerization (the dispersing stabilizer added in this stage is hereinafter referred to as "first dispersing stabilizer"), and the dispersing stabilizer in an amount for supplying the deficiency of dispersing stabilizer in the aqueous phase is after-added to the polymerization system, continuously or intermittently, over the period from the start of polymerization to a predetermined time point (the dispersing stabilizer added in this stage is hereinafter referred to as "second dispersing stabilizer"), whereby the above-mentioned problems can be effectively solved. The start of polymerization herein means the time point at which a polymerization initiator is charged into a polymerization vessel and heating for raising the temperature inside the vessel is started.

It is of extreme importance that the addition of the second dispersing stabilizer should be made continuously or intermittently, over the period from the start of polymerization to the time when a predetermined polymerization conversion is reached. If the second dispersing stabilizer is added wholly at a time, an abrupt change in surface tension is brought about, leading to such disadvantages as poor reproducibility of polymer particles, smaller polymer particle size, lowered bulk specific gravity, increased fish eyes, and the like. It has not been elucidated why the continuous or intermittent addition of the dispersing stabilizer over a certain period, instead of adding the stabilizer wholly at a time, can obviate the above-mentioned disadvantages. It is presumed, however, that the monomer droplets in the aqueous phase are coated with the suspending agent present in a substantially fixed concentration with the result of more uniform coalescence and dispersion of the monomer droplets. In adding the second dispersing stabilizer intermittently, the intervals of addition should be selected so as not to spoil the merits offered by the present invention as to bulk specific gravity, gelation rate, fish eye, and the like. It should be noted that too long intervals of addition give rise to disadvantages similar to those in the case of adding the dispersing stabilizer wholly at a time.

As the first and the second dispersing stabilizer in the process according to the present invention, a partially saponified polyvinyl alcohol having an average polymerization degree of 600 to 800, preferably 700 to 800, and a saponification degree of 65 to 75 mol %, preferably 70 to 75 mol %, is used.

In special polymerization processes such as the process of the present invention, use of other partially saponified polyvinyl alcohol than the above-specified will produce various problems as follows.

If a partially saponified polyvinyl alcohol with an average polymerization degree of below 600 is used, the protective effect produced on monomer droplets is low and, accordingly, the monomer droplets are liable to coalesce. In such a case, the resulting polymer may be in the form of coarse particles or in a block-like massive form.

On the other hand, if the average polymerization degree exceeds 800 or the saponification degree exceeds 75 mol %, the resulting polymer has a lowered porosity though it has a raised bulk specific gravity. In this case, there arise the problems of poor gelling property and increased fish eyes.

If a partially saponified polyvinyl alcohol with a saponification degree of below 65 mol % is used, the proportion of the dispersing stabilizer acting on the monomer is too large, so that the stability of dispersion in the aqueous medium is lowered In such a case, the resulting polymer may be in the form of coarse particles or in a block-like massive form.

Accordingly, partially saponified polyvinyl alcohols having an average polymerization degree of 1500 to 3000 and a saponification degree of around 80 mol % which have been often used for polymerization of vinyl chloride and vinyl chloride-based monomeric mixtures cannot be applied as the first and the second dispersing stabilizer in the process of the present invention.

As the first and the second dispersing stabilizer in the present invention, only the partially saponified polyvinyl alcohol as above specified is used. That is to say, other dispersing stabilizers, for example, other partially saponified polyvinyl alcohols than the above specified; water-soluble cellulose ethers such as methyl cellulose, ethyl cellulose, hydroxyethyl cellulose, hydroxypropyl cellulose, hydroxypropyl methyl cellulose and the like; water-soluble polymers such as polyacrylic acid, gelatin, styrene-maleic acid copolymers, polyvinyl pyrrolidone and the like; oil-soluble emulsifying agents such as sorbitan monolaurate, sorbitan trioleate, sorbitan monostearate, glycerin tristearate, ethylene oxide-propylene oxide block copolymers and the like; and water-soluble emulsifying agents such as polyoxyethylenesorbitan monolaurate, polyoxyethyleneglycerin oleate, sodium laurate and the like, can substantially not be used together with the above-specified partially saponified polyvinyl alcohol as the dispersing stabilizer in the process of the present invention.

Use of such other dispersing stabilizers than the above-specified partially saponified polyvinyl alcohol leads to a lowering in thermal stability of the resulting vinyl chloride-based polymer, for some reason which has not been elucidated.

In the present invention, the amount of the first dispersing stabilizer added before the start of polymerization ranges from 0.01 to 0.1% by weight, preferably from 0.03 to 0.05% by weight, based on the amount of the monomer or monomeric mixture. If the amount of the first dispersing stabilizer is below the range, the suspension system becomes unstable, resulting in the formation of polymer as coarse particles or in a block-like massive form. If the amount is above the range, on the other hand, it is difficult to obtain a polymer with high bulk specific gravity and it is also difficult to improve gelation rate.

The total amount of the second dispersing stabilizer added continuously or intermittently over the period from the start of polymerization to the moment a polymerization conversion of 10 to 30% is reached ranges from 0.01 to 0.1% by weight, preferably from 0.02 to 0.05% by weight, based on the amount of the monomer or monomeric mixture. If the total amount of the second dispersing stabilizer is below the range, the deficiency of the dispersing stabilizer in the aqueous phase cannot be made up for, so that there arise formation of coarse polymer particles in increased proportions, formation of increased numbers of fish eyes in shaped polymer products, and the like. If the total amount is below the range, there will be formation of fine polymer particles in increased proportions, a decrease in porosity with the result of lowered gelation rate, and the like.

If the addition of the second dispersing stabilizer is started before the start of polymerization, it is difficult to obtain a polymer with high bulk specific gravity. On the other hand, if the addition is continued even after a polymerization conversion of 30% is exceeded, the resulting polymer has a lowered porosity although it has an enhanced bulk specific gravity; in such a case, increased fish eyes and lowered gelation rate result.

Polymerization conversion may be preliminarily measured for a given polymerization reaction system at predetermined lapses of time from the start of polymerization, whereby the conversion during each polymerization run can be estimated from elapsed time.

The weight ratio of the amount of the first dispersing stabilizer to the amount of the second dispersing stabilizer preferably ranges from 2:1 to 3:5. If the amount of the first dispersing stabilizer is too large, in view of the weight ratio range, the resulting polymer has a lower bulk specific gravity and a lower gelation rate. Adding the second dispersing stabilizer in too large an amount, in view of the weight ratio range, also tends to lower the gelation rate of the resulting polymer.

Components for Polymerization.

In the process according to the present invention, the monomeric material to be polymerized may be vinyl chloride alone or be a monomeric mixture containing vinyl chloride as a main constituent together with other monomer copolymerizable with vinyl chloride (normally, the vinyl chloride content of the monomeric mixture is 50% by weight or above). The copolymerizable monomer (comonomer) includes, for example, vinyl esters such as vinyl acetate, vinyl propionate and the like; (meth)acrylic esters such as methyl acrylate, ethyl acrylate and the like; olefins such as ethylene, propylene and the like; maleic anhydride; acrylonitrile; styrene; vinylidene chloride, and so forth.

Other components for polymerization which may be suspended and dispersed in the aqueous medium together with the above monomer or monomeric mixture include polymerization initiators. As the polymerization initiator, those which are conventionally used in polymerization of vinyl chloride can be used. The initiators which can be used include, for example, per-ester compounds such as t-butyl peroxyneodecanoate, t-hexyl peroxyneodecanoate, t-hexyl peroxypivalate, α-cumyl peroxyneodecanoate, t-hexyl peroxyneohexanoate, 2,4,4-trimethylpenty-2-peroxy-2-neodecanoate and the like; percarbonate compounds such as diisopropyl peroxydicarbonate, di-2-ethylhexyl peroxydicarbonate, di-2-ethoxyethyl peroxydicarbonate, dimethoxyisopropyl peroxydicarbonate and the like; peroxide compounds such as decanoyl peroxide, lauroyl peroxide, benzoyl peroxide, cumene hydroperoxide, cyclohexanone peroxide, 2,4-dichlorobenzoyl peroxide, p-menthane hydroperoxide, 3,5,5-trimethylhexanoyl peroxide, isobutyryl peroxide, acetylcyclohexylsulfonyl peroxide and the like; and azo compounds such as α,α'-azobisisobutyronitrile, α,α'-azobis(2,4-dimethylvaleronitrile), α,α'-azobis(4-methoxy-2,4-dimethylvaleronitrile) and the like. These initiators may be used either singly or in combination of two or more. The above polymerization initiators are oil-soluble initiators. Also usable are water-soluble polymerization initiators, such as potassium persulfate, ammonium persulfate, hydrogen peroxide, etc., and these may be used either singly or in combination of two or more. The polymerization initiator may be added during charging of water or monomeric material into a polymerization vessel, or after the charging. Alternatively, the polymerization initiator may be preliminarily mixed uniformly into monomeric material, to be charged into the polymerization vessel together with the monomeric material. Further, the initiator may be charged together with the aqueous medium, as an aqueous emulsion.

Polymerization Conditions

In the process according to the present invention, suspension polymerization may be carried out under conditions which are known per se, except that the suspending and dispersing of the monomeric material and the like in the aqueous medium is carried out by using the first dispersing stabilizer and, after polymerization is started, the second dispersing stabilizer is added to the polymerization system with a predetermined timing.

For example, the aqueous medium for suspending and dispersing therein the components for polymerization such as monomeric material may be used in an amount (in terms of water) of about 0.8 to 4.0 times the amount of monomeric material, as in the conventional processes. Further, water or the monomeric material may be additionally charged during polymerization, as required.

Besides, the amount of the polymerization initiator, polymerization temperature and the like may be within those respective ranges which are used conventionally.

Furthermore, polymerization degree controllers, pH adjustors and the like may also be added to the polymerization system, as required.

EXAMPLES

In the following examples, bulk specific gravity, particle size distribution, fish eyes, gelation time and thermal stability of each vinyl chloride-based polymer obtained were measured according to the methods below.

Bulk specific gravity:
  Measured according to JIS K 6721.
Particle size distribution:
  Using 60-, 80-, 100-, 120-, 150- and 200-mesh sieves according to JIS Z 8801, the polymer particles were sifted, and the amount of polymer particles (% by weight) having passed through each sieve was measured.
Fish eye:
  A mixture prepared by mixing 100 parts by weight of the vinyl chloride polymer sample, 1 part by weight of tribasic lead sulfate, 1.5 parts by weight of lead stearate, 0.2 part by weight of titanium oxide, 0.1 part by weight of carbon black and 50 parts by weight of dioctyl phthalate, was kneaded by rolls at 143° C. for 3 minutes, and formed into a sheet 0.2 mm in thickness. For the sheet thus obtained, the number of fish eyes per 100 cm$^2$ area was counted.
Gelation time:
  68.5 g of a mixture prepared by mixing 100 parts by weight of the vinyl chloride polymer sample, 0.5 part by weight of tribasic lead sulfate, 2.5 parts by weight of lead stearate and 0.7 part by weight of barium stearate was kneaded in a plastograph (produced by Brabender OHG) under the conditions of 205° C. and 50 rpm, and the period of time elapsed before a maximum torque was obtained was measured as gelation time. The shorter the gelation time, the better the gelling properties of the resin.
Thermal stability:
  A mixture prepared by mixing 100 parts by weight of the vinyl chloride polymer sample, 3.0 parts by weight of lead stearate and 1.0 part by weight of tribasic lead sulfate was kneaded by rolls at 175° C. for 5 minutes, and formed into a sheet 1 mm in thickness. The sheet was placed into and heated in an oven at 190° C., and the period of time (min) elapsed before the sheet turned black was measured.

Example 1

Into a 2-m$^3$ stainless-steel autoclave equipped with stirrer and jacket, 900 kg of deionized water was charged and 8750 g of a 4.0 wt. % aqueous solution of a partially saponified polyvinyl alcohol (A) having a saponification degree of 72.9 mol %, an average polymerization degree of 780, a viscosity of its 4% aqueous solution at 20° C. of 7.3 cP, and a UV absorption of its 1% aqueous solution at a wavelength of 280 nm of 3.0 (as first dispersing stabilizer) was added.

Next, the autoclave was evacuated to bring the internal pressure to about 50 mmHg, and was charged with 700 kg of vinyl chloride monomer. While stirring the resulting mixture in the autoclave, hot water was passed through the jacket to thereby start heating, and 1200 g of a 20 wt. % aqueous emulsion of di-2-ethylhexyl peroxydicarbonate as a polymerization initiator was charged into the autoclave. Simultaneously, addition of another 8750 g of the aqueous solution of partially saponified polyvinyl alcohol (A) (as second dispersing stabilizer) was started at a rate of 60 g/min, and the addition was carried out continuously until a polymerization conversion of 20% was reached.

Polymerization was continued at a temperature of 57° C. until the autoclave internal pressure reached 6.0 kg/cm$^2$.G, upon which the reaction was stopped. Unreacted monomer was removed from the reaction mixture, which was then dehydrated and dried to give a vinyl chloride polymer.

The polymer thus obtained was tested to determine bulk specific gravity, particle size distribution, fish eye, gelation time and thermal stability. The results are given in Table 1.

Example 2

Preparation of a polymer and measurements of properties of the polymer were carried out in the same manner as in Example 1, except that 5250 g of a 4.0 wt. % aqueous solution of a partially saponified polyvinyl alcohol (B) having a saponification degree of 72.4 mol %, an average polymerization degree of 770, a viscosity of its 4% aqueous solution at 20° C. of 6.5 cP and a UV absorption of its 1% aqueous solution at a wavelength of 280 nm of 3.0 was added before the start of polymerization, in place of the aqueous solution of partially saponified polyvinyl alcohol (A) which was used in Example 1, and 3500 g of the aqueous solution of partially saponified polyvinyl alcohol (B) was added at a rate of 24 g/min continuously from the start of polymerization on, in place of the aqueous solution of partially saponified polyvinyl alcohol (A) used in Example 1.

The results are given in Table 1.

Example 3

Preparation of a polymer and measurements of properties of the polymer were carried out in the same manner as in Example 1, except that the addition of the aqueous solution of partially saponified polyvinyl alcohol (A) as the second dispersing stabilizer, over the period from the start of polymerization until a polymerization conversion of 20% was reached, was carried out in 12 batches at regular intervals of 12 min, with an addition amount being 60.3 g in each batch, instead of being carried out continuously at a fixed rate as in Example 1.

The results are given in Table 1.

Comparative Example 1

Preparation of a polymer and measurements of properties of the polymer were carried out in the same manner as in Example 1, except that the total amount of the aqueous solution of partially saponified polyvinyl alcohol (A) used as the first and the second dispersing stabilizer in Example 1 was wholly added before the start of polymerization. The results are given in Table 1.

Comparative Example 2

Preparation of polymer and measurements of properties of the polymer were carried out in the same manner as in Example 1, except for omitting the addition of the aqueous solution of partially saponified polyvinyl alcohol (A) as the second dispersing stabilizer. The results are given in Table 1.

Comparative Example 3

Preparation of a polymer and measurements of properties of the polymer were carried out in the same manner as in Example 1, except that the addition of the aqueous solution of partially saponified polyvinyl alcohol (A) during polymerization was continuously carried out at a rate of 65 g/min over the period from the moment a polymerization conversion of 30% was reached to the moment a polymerization conversion of 50% was reached. The results are given in Table 1.

Comparative Example 4

Preparation of a polymer and measurements of properties of the polymer were carried out in the same manner as in Example 1, except that the addition of the aqueous solution of partially saponified polyvinyl alcohol (A) during polymerization was carried out in a single batch at the time when a polymerization conversion of 20% was reached. The results are given in Table 1.

Comparative Example 5

Preparation of a polymer and measurements of properties of the polymer were carried out in the same manner as in Example 1, except that 3675 g of a 4.0 wt. % aqueous solution of a partially saponified polyvinyl alcohol (C) having an average polymerization degree of 2600 and a saponification degree of 80.2 mol % and 1800 g of a 3.5 wt. % aqueous solution of a hydroxypropyl methyl cellulose (D) having a methoxy substitution degree of 29.2 wt. %, a hydroxypropoxy substitution degree of 8.9 wt. % and a viscosity of its 2 wt. % aqueous solution at 20° C. of 49.5 cP were added before the start of polymerization, in place of the aqueous solution of partially saponified polyvinyl alcohol (A) which was used in Example 1, and that 3650 g of a mixed aqueous solution obtained by mixing 2450 g of the aqueous solution of partially saponified polyvinyl alcohol (C) with 1200 g of the aqueous solution of hydroxypropyl methyl cellulose (D) was continuously added at a rate of 25.2 g/min from the start of polymerization on. The results are given in Table 1.

Comparative Example 6

Preparation of a polymer and measurements of properties of the polymer were carried out in the same manner as in Example 1, except that 5250 g of the aqueous solution of partially saponified polyvinyl alcohol (C) and 4000 g of the aqueous solution of hydroxypropyl methyl cellulose (D) were added before the start of polymerization, in place of the aqueous solution of partially saponified polyvinyl alcohol (A) which was used in Example 1, and that 7500 g of the aqueous solution of partially saponified polyvinyl alcohol (C) was continuously added at a rate of 51.7 g/min from the start of polymerization on. The results are given in Table 1.

Comparative Example 7

Preparation of a polymer and measurements of properties of the polymer were carried out in the same manner as in Example 1, except that 8750 g of the aqueous solution of partially saponified polyvinyl alcohol (C) was added before the start of polymerization, in place of the aqueous solution of partially saponified polyvinyl alcohol (A) which was used as first dispersing stabilizer in Example 1, and that 8750 g of the aqueous solution of partially saponified polyvinyl alcohol (C) was continuously added at a rate of 60 g/min from the start of polymerization on, in place of the aqueous solution of partially saponified polyvinyl alcohol (A) which was used as second dispersing stabilizer in Example 1. The results are given in Table 1.

TABLE 1

|  | Example | | | Comparative Example | | | | | | |
|---|---|---|---|---|---|---|---|---|---|---|
|  | 1 | 2 | 3 | 1 | 2 | 3 | 4 | 5 | 6 | 7 |
| First dispersing stabilizer | | | | | | | | | | |
| (A) | 0.05 | — | 0.05 | 0.10 | 0.05 | 0.05 | 0.05 | — | — | — |
| (B) | — | 0.03 | — | — | — | — | — | — | — | — |
| (C) | — | — | — | — | — | — | — | 0.021 | 0.03 | 0.05 |
| (D) | — | — | — | — | — | — | — | 0.009 | 0.02 | — |
| Second dispersing stabilizer | | | | | | | | | | |
| (A) | 0.05 | — | 0.05 | — | — | 0.05 | 0.05 | — | — | — |
| (B) | — | 0.02 | — | — | — | — | — | — | — | — |
| (C) | — | — | — | — | — | — | — | 0.014 | 0.05 | 0.05 |
| (D) | — | — | — | — | — | — | — | 0.006 | — | — |
| Bulk specific gravity | 0.562 | 0.563 | 0.565 | 0.538 | 0.512 | 0.551 | 0.528 | 0.560 | 0.579 | 0.612 |
| Particle size | | | | | | | | | | |
| 60 mesh | 100 | 100 | 100 | 100 | 86.2 | 93.4 | 93.5 | 100 | 100 | 100 |
| 80 mesh | 86.2 | 73.5 | 80.6 | 62.3 | 61.2 | 76.2 | 69.3 | 97.7 | 100 | 100 |
| 100 mesh | 52.9 | 42.4 | 48.7 | 36.1 | 26.1 | 35.6 | 30.6 | 73.1 | 90.5 | 92.3 |
| 120 mesh | 23.1 | 12.9 | 20.9 | 11.2 | 10.8 | 10.9 | 11.1 | 34.0 | 62.4 | 67.0 |
| 150 mesh | 5.9 | 3.1 | 4.8 | 4.6 | 5.6 | 5.4 | 5.5 | 13.2 | 21.7 | 25.8 |
| 200 mesh | 0.7 | 0.3 | 0.4 | 0.6 | 2.1 | 1.9 | 0.8 | 1.9 | 6.6 | 9.9 |
| Fish eye | 5 | 6 | 8 | 95 | 170 | 180 | 132 | 10 | 165 | 215 |
| Gelation time (min) | 4.8 | 4.9 | 4.9 | 6.2 | 6.1 | 7.3 | 5.9 | 5.1 | 8.0 | 9.6 |
| Thermal stability (min) | 120 | 110 | 120 | 115 | 110 | 110 | 115 | 90 | 105 | 120 |

Note: Numerical values given under the "dispersing stabilizer" are amounts of dispersing stabilizer, in % by weight based on the amount of monomer.

We claim:

1. A process for producing a vinyl chloride-based polymer, consisting of the steps of adding vinyl chloride monomer or a vinyl chloride-containing monomeric mixture into a polymerization vessel, suspending and dispersing the vinyl chloride monomer or vinyl chloride-containing monomeric mixture in an aqueous medium placed in the polymerization vessel with a dispersing stabilizer, and starting suspension polymerization, wherein said dispersing stabilizer is a partially saponified polyvinyl alcohol having an average polymerization degree of 600 to 800 and a saponification degree of 65 to 75 mol % in an amount of 0.01 to 0.1% by weight based on the amount of the monomer or monomeric mixture, and during the suspension polymerization, an additional amount of the partially saponified polyvinyl alcohol is after-added to the polymerization reaction system in a continuous or intermittent manner over the period from the start of suspension polymerization to the time when a polymerization conversion of 10 to 30% is reached, said additional amount being 0.01 to 0.1% by weight based on the amount of the monomer or monomeric mixture.

2. The process of claim 1, wherein the amount of the partially saponified polyvinyl alcohol added before the polymerization is started is from 0.03 to 0.05% by weight based on the amount of the monomer or monomeric mixture.

3. The process of claim 1, wherein the amount of the partially saponified polyvinyl alcohol added after the polymerization is started is from 0.02 to 0.05% by weight based on the amount of the monomer or monomeric mixture.

4. The process of claim 1, wherein the weight ratio of the polyvinyl alcohol added before the polymerization is started to the amount of the polyvinyl alcohol added after the polymerization is started is in the range from 2:1 to 3:5.

5. The process of claim 1, wherein the partially saponified polyvinyl alcohol has an average polymerization degree of 700 to 800 and a saponification degree of 70 to 75 mol %.

* * * * *

UNITED STATES PATENT AND TRADEMARK OFFICE
CERTIFICATE OF CORRECTION

PATENT NO.  : 5,376,747
DATED       : December 27, 1994
INVENTOR(S) : Minoru SHIGEMITSU, et al.

It is certified that error appears in the above-indentified patent and that said Letters Patent is hereby corrected as shown below:

On the title page, Item [54], and Column 1, Lines 2-5, the title should read:

--PROCESS FOR PRODUCING VINYL CHLORIDE-BASED POLYMER VIA CONTINUOUS OR INTERMITTENT ADDITION OF DISPERSING STABILIZER--

Signed and Sealed this

Second Day of May, 1995

Attest:

BRUCE LEHMAN

Attesting Officer    Commissioner of Patents and Trademarks